UNITED STATES PATENT OFFICE 3,793,358
Patented Feb. 19, 1974

3,793,358
PROCESS FOR MANUFACTURE OF
ALKENYLSILANES
Ignaz Bauer, Siegfried Nitzsche, Norbert Zeller, and
Werner Graf, Burghausen, Germany, assignors to
Wacker-Chemie GmbH, Munich, Germany
No Drawing. Filed June 22, 1972, Ser. No. 265,116
Claims priority, application Germany, June 25, 1971,
P 21 31 742.0
Int. Cl. C07f 7/08, 7/18
U.S. Cl. 260—448.2 E                    20 Claims

ABSTRACT OF THE DISCLOSURE

A process for preparing alkenylsilanes by reacting acetylene or substituted acetylene with a silane having at least 1 silicon bonded hydrogen atom in the presence of an addition catalyst and disilylethane at a temperature of from about 120° C. to about 220° C. at a pressure of from about 0.1 to about 5 atmospheres gauge.

---

The invention relates to an improved process for the manufacture of alkenylsilanes by addition of optionally substituted acetylenes to silanes which contain 1 or 2 Si-bonded hydrogen atoms, with the silicon valencies not saturated by hydrogen atoms being saturated by halogen atoms and/or inert monovalent organic radicals, in the presence of addition catalysts and liquid diluents, under warm conditions.

German Auslegeschrift 1,232,580 discloses a process according to which vinylhalogenosilanes are manufactured by reaction of acetylene with a halogenosilane which contains 1 or 2 hydrogen atoms bonded to silicon and optionally, an inert monovalent organic radical, in the presence of a platinum catalyst, in a liquid diluent and under atmospheric pressure and warm conditions. This process and the process according to the invention have, for example, the advantages over other processes for the manufacture of alkenylhalogenosilanes of yielding less disilylethane and better yields of alkenylsilanes and/or requiring lower temperatures and/or avoiding the use of acetylene under pressures of at least 8 atmospheres gauge.

The process according to the invention has further advantages over the process described in German Auslegeschrift 1,232,580, for example, in order to achieve good yields of alkenylsilanes, the observance of narrow temperature ranges is not necessary. No alkenylsilane, or practically no alkenylsilane, is retained by the diluent before issuing from the reaction space, and there is no need to distil the alkenylsilane from the diluent in a special apparatus during or after completion of the process. Thus, the formation of disilylethane from the unreacted silane employed and alkenyl silane, which occurs during distillation, is avoided, as is the possible decomposition of the catalyst. It is not necessary to separate, with considerable effort, a diluent from the disilylethane which is produced in small amounts as a by-product, if this disilylethane is required. Furthermore, alkenylsilanes are obtained which without further distillation are free, or practically free, of silane containing Si-bonded hydrogen. Additionally, the activity of the catalyst is maintained for a longer period in the process according to the invention. Finally, the process according to the invention gives considerably better space-time yields of alkenylsilanes. The increase in the space-time yields, especially coupled with lower catalyst consumption, is particularly surprising because in the process according to the invention it is achieved, inter alia, by working at temperatures of at least 120° C. though the above-mentioned Auslegeschrift states that in general there is no value in exceeding 120° C. In fact, according to the examples of this Auslegeschrift the temperatures in the exothermic reaction are kept below 120° C. because in aromatic hydrocarbons or their alkyl or chlorine derivatives, which are used as diluents, the yields of alkenylsilanes greatly drop at temperatures above 120° C. and the catalyst activity rapidly declines.

This invention provides a process for the manufacture of an alkenylsilane by addition of, optionally substituted, acetylene to a silane which contains 1 or 2 Si-bonded hydrogen atoms, with the silicon valencies not saturated by hydrogen atoms being saturated by halogen atoms and/or inert monovalent organic radicals, wherein the addition reaction is carried out using an addition catalyst in a disilylethane as essentially the sole liquid diluent present in the reaction vessel before the start of the reaction, at a temperature of from 120° C. to 220° C. and at a pressure of from 0.1 to 5.0 atmospheres gauge, and the resulting alkenylsilane is removed continuously as a gas from the reaction space at the rate at which it is formed.

The expression "essentially the sole liquid diluent present in the reaction vessel before the start of the reaction" means that the disilylethane acting as a diluent is already present in the reaction vessel before the start of the reaction and is not solely formed during the reaction, and that the simultaneous presence of other diluents, since it produces no advantages, should as far as possible be avoided with the exception of the small amounts of solvents which may be introduced with the catalyst into the reaction vessel.

The expression "the resulting alkenylsilane is removed continuously as a gas from the reaction space at the rate at which it is formed" means that the particular temperature chosen, within the temperature range of from 120° C. to 220° C., preferably 130° to 160° C., for carrying out the process according to the invention is above the boiling point of the particular alkenylsilane to be produced, at the particular pressure chosen, and that no special measures such as, say, a reflux condenser operated at very low temperature, are employed in order to retain the alkenylsilane in the reaction space or to return it thereto, and that the alkenylsilane does not leave the reaction space in the liquid phase.

As acetylene it is possible to use, in the process according to the invention, acetylene or any of the substituted acetylenes which it has hitherto been possible to use for the manufacture of alkenylsilanes by addition of acetylenes to silicon compounds with Si-bonded hydrogen. Examples of such substituted acetylenes are especially compounds of the general formula RC≡CH, wherein R is a monovalent hydrocarbon radical, for example 1-pentine, 1-hexine, 1-heptine, vinylacetylene and phenylacetylene, and also halogenoacetylenes such as dichloroacetylene. Since, however, acetylene is more easily accessible than substituted acetylenes and silanes with unsubstituted vinyl groups are of especially great importance, the use of acetylene (HC≡CH) is preferred in the process according to the invention. If desired, it is also possible to employ mixtures of acetylene and one or more substituted acetylenes or mixtures of different substituted acetylenes in the process according to the invention. The optionally substituted acetylene is advantageously employed in the anhydrous form.

The silanes which contain 1 or 2 Si-bonded hydrogen atoms, the silicon valencies not saturated by hydrogen atoms being saturated by halogen atoms and/or inert monovalent organic radicals, may be represented by the general formula

$$R'_x SiH_y X_{4-x-y}$$

wherein R' is a monovalent inert organic radical, X is a halogen atom, $x$ is 0, 1, 2 or 3, $y$ is 1 or 2 and the sum of $x+y$ is 1, 2, 3 or 4.

Identical or different radicals R' and halogen atoms X can be bonded to the individual Si atoms in these silanes.

Examples of radicals R' are hydrocarbon radicals free of aliphatic multiple bonds, for example, alkyl radicals, for example methyl, ethyl, n-propyl, isopropyl, n-butyl, sec.-butyl, n-hexyl and 2-ethylhexyl radicals; cycloalkyl radicals, for example cyclopentyl, cyclohexyl and methylcyclohexyl radicals; aryl radicals, for example the phenyl radicals; alkaryl radicals, for example the tolyl radicals; aralkyl radicals, for example the benzyl radicals; and halogenated hydrocarbon radicals free of aliphatic multiple bonds, for example, fluoroalkyl radicals, for example the 3,3,3-trifluoropropyl radical; chloroalkyl radicals, for example, the gamma-chloropropyl radical; and chlorophenyl radicals, for example o-, p- and m-chlorophenyl radicals. Because of easy accessibility, the methyl radical is preferred as the radical R'.

The halogen atoms X may be fluorine, chlorine, bromine or iodine atoms. Because of easy accessibility, chlorine is preferred as the halogen X.

Because the most important use of the alkenylsilanes is the manufacture of organoloplysiloxanes containing alkenyl groups, and because alkenylsilanes with hydrolyzable groups are of the greatest importance, the sum of $x+y$ is preferably not greater than 3.

Examples of the silanes preferably used in the process according to the invention, to which acetylene and/or substituted acetylene is added, are thus methyldichlorosilane, dimethychlorosilane and trichlorosilane.

If desired, mixtures of different silanes can be employed.

Appropriately, more than one 1 gram mol of acetylenically unsaturated compound is employed per gram atom of Si-bonded hydrogen.

As addition catalysts it is possible to use, in the process according to the invention, those addition catalysts that it has hitherto been possible to employ as catalysts in the manufacture of alkenylsilanes by addition of optionally substituted acetylene to silicon compounds with the Si-bonded hydrogen, provided that they are sufficiently stable under the particular reaction temperature chosen. Examples of substances which can be used as addition catalysts in the process according to the invention are especially platinum catalysts, for example, chloroplatinic acid ($H_2PtCl_6 \cdot 6H_2O$) and reaction products or complexes of chloroplatinic acid with other inorganic and/or organic compounds, and platinum on aluminium oxide; other catalysts are palladium on an aluminum oxide, calcium carbonate and/or barium carbonate support, rhodium compounds and cobalt carbonyls.

Among the platinum catalysts, platinum compounds are preferred to metallic platinum.

Especially preferred addition catalysts, because of their high catalytic activity and high stability, which implies a particularly low consumption of catalyst, are reaction products of chloroplatinic acid with ketones, preferably ketones which are free of aliphatic multiple bonds, for example, cyclohexanone, methyl ethyl ketone, acetylacetone and/or acetophenone, especially cyclohexanone. These reaction products are most simply manufactured by heating a solution of commercially available chloroplatinic acid in the ketone with which the acid is to be reacted, for a period of from 0.5 to 6 hours at a temperature of from 60° C. to 120° C. and are employed in the form of the solution thus obtained after removal of the water formed in the reaction, for example by means of sodium sulphate. To manufacture these solutions, preferably 20 to 2,000 parts by volume of ketone are used per part by weight of chloroplatinic acid. In this context, attention is drawn to German patent application P 21 31 741.9 "Process for the Addition of Silicon Compounds With Si-Bonded Hydrogen to Compounds With Aliphatic Multiple Bonds," filed June 22, 1972.

The addition catalysts may be used in the same amounts in which it has hitherto been possible to use the catalysts in processes for he manufacture of alkenylsilanes by addition of optionally substituted acetylene to silicon compounds with Si-bonded hydrogen in the presence of addition catalysts. If, for example, platinum catalysts are used other than as fixed bed catalysts, the amounts are frequently 0.05 to 50 mg. of platinum per gram atom of Si-bonded hydrogen. Especially good results are achieved if in addition to the catalyst present in the reaction vessel before the reaction, further amounts of catalyst are introduced batchwise or continuously into the reaction vessel during the addition reaction.

Disilylethanes used in the process according to the invention are preferably those which can be produced by the addition of 1 mol of optionally substituted acetylene to 2 mols of a silane which contains one or 2 Si-bonded hydrogen atoms, with the silicon valencies not saturated by hydrogen atoms being saturated by halogen atoms and/or inert monovalent organic radicals, or by reaction of the silanes defined above with vinylsilanes, for example in accordance with the following equations:

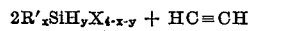

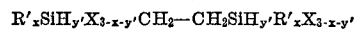

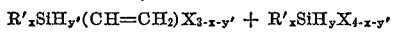

wherein R', X, x and y each have the meaning given for them above and y' is 0 or 1.

Advantageously, if unsubstituted acetylene is employed, the disilylethane used, for simplicity, always the one which can be produced as a by-product in the particular process according to the invention that is being carried out. Thus, if for example vinylmethyldichlorosilane is to be manufactured as the alkenylsilane by addition oc aceteylene to methyldichlorosilane, disilylethane of the formula $$(CH_3Cl_2SiCH_2)_2$$

is preferably used as the diluent.

The amount of diluent to be used is not decisive in the process according to the invention. It depends above all on the working conditions, for example, on the nature of the apparatus used for carrying out the process according to the invention and the speed of introduction of the reactants.

The lower limit of the temperatures chosen in carrying out the process according to the invention is imposed by the boiling point of the particular alkenylsilane to be manufactured and the upper limit by the decomposition temperature of the constituents of the reaction mixture. In order that all initially described advantages of the process according to the invention are realized the temperature must, however, not be below 120° C.

The process according to the invention is preferably carried out at 130° C. to 160° C. since thereby the best space-time yields are achieved with particularly long-lasting catalyst activity and hence particularly low catalyst consumption.

The process according to the invention is preferably carried out at 0.1 to 0.5 atmospheres gauge since this does not require any special safety precautions. It is surprising that even this relatively low excess pressure leads to a noticeable rise in the space-time yield of alkenyl-silanes without promoting the formation of disilylethanes.

The process according to the invention is preferably carried out continuously by passing a mixture of optionally substituted acetylene and silane, to which the acetylene is to be added, into the disilylethane, in which the addition catalyst is dissolved or dispersed, and which is kept at a temperature in the range of from 120° C. to 220° C., preferably 130° to 160° C. The alkenylsilane which hereupon distills off is so pure that for many end uses a further purification, for example, by distillation, is superfluous. The unreacted excess acetylene can be recycled into the apparatus for the manufacture of the mixture of acetylene and starting silane, whilst maintaining, in this cycle, the particular pressure chosen for the addition reaction.

The amounts of acetylene quoted in litres in the following illustrative examples were in each case determined at 0.4 atmospheres gauge.

EXAMPLE 1

Under a pressure of 0.4 atmospheres gauge, 500 l./hour of acetylene dried with sulphuric acid are mixed, in a 2 l. flask kept at about 15° C., which is about half filled with methyldichlorosilane and equipped with a calibrated dropping funnel for topping up of silane, with 1,370 g./hour of methyldichlorosilane by passing the acetylene through the silane, and the mixture is passed at the abovementioned pressure, from below, through a perforated plate into a 1.5 m. high reaction tower of internally enamelled steel. The reaction tower is of 7.5 l. capacity, of which 6 l. are occupied by the disilylethane of the formula $(CH_3Cl_2SiCH_2)_2$ in which 20 mg. of platinum are dissolved in the form of chloroplatinic acid. Before, and at the beginning of, the introduction of the reactants the contents of the tower are kept at 140° C.±10° C. by means of electrical jacket heating, whilst it is thereafter kept at this temperature by heat of reaction. At the upper end in the interior of the reaction tower, the pressure is set to 0.2 atmosphere gauge. At the upper end of the tower there is a vessel of 2 l. capacity and spherical shape, that is to say a so-called "defoaming globe." From the bottom quarter of this globe, liquid material passing from the reaction space into the defoaming globe is returned through a pipeline into the reaction tower at the lower end, just above the perforated plate, and the amount of disilylethane which exceeds the originally employed amount of disilylethane is withdrawn through a branch of this pipeline 15 cm. below the defoaming globe. 5 cm. below the branch, 1.5 ml. (6 mg. of platinum) per hour of a solution of 1 g. of chloroplatinic acid in 100 ml. of benzyl alcohol are introduced into the pipeline leading from the defoaming globe. Above the defoaming globe there is a dephlegmator, from which disilylethane which has been carried away runs back into the defoaming globe. The gaseous or vaporous material which issues from the dephlegmator is withdrawn through a condenser run at —20° C. Vinylmethyldichlorosilane containing not more than 1 percent by weight of methyldichlorosilane is obtained as the condensate in a yield of 88% of theory based on the methyldichlorosilane employed.

EXAMPLE 2

The procedure described in Example 1 is repeated in the apparatus described in Example 1, with the following modifications:

Instead of 500 l./hour of acetylene, 750 l. acetylene/hour are employed, instead of 1,370 g./hour of methyldichlorosilane 1,900 g./hour of methylidichlorosilane are employed, and instead of 6 mg. of platinum, 9 mg. of platinum per hour are employed in the form of chloroplatinic acid. The process is carried out at 160° C.±10° C. instead of 140° C. The condensate obtained from the condenser operated at —20° C. is vinylmethyldichlorosilane which does not contain more than 1 percent by weight of methyldichlorosilane, in a yield of 87% of theory based on the methylidichlorosilane employed.

EXAMPLE 3

The procedure described in Example 1 is repeated in the apparatus described in Example 1, with the modificaations that instead of 1,370 g./hour of methyldichlorosilane 1,780 g./hour of trichlorosilane are used, instead of the temperature of the 2 l. flask being kept at about 15° C. it is kept at about 7° C., instead of 6 l. of the disilylethane of the formula $(CH_3Cl_2SiCH_2)_2$ 6 l. of the disilylethane of the formula $(CL_3SiCH_2)_2$ are used and instead of 6 mg. of platinum 4 mg. of platinum are used per hour in the form of chloroplatinic acid. The condensate obtained from the condenser operated at —20° C. is vinyltrichlorosilane which contains not more than 4 percent by weight of trichlorosilane, in a yield of 95% of theory based on the trichlorosilane employed.

EXAMPLE 4

1.25 l./hour of trichlorosilane are passed into an evaporator by means of a metering pump. The evaporated silane is mixed with 1.5 mol of acetylene, which has been dried over sulphuric acid, per mol of silane and is passed under a pressure of 0.4 atmosphere gauge from below through a perforated plate into a 1.5 m. high reaction tower of internally enamelled steel. The reaction tower has a capacity of 7.5 l., of which 6 l. are occupied by the disilylethane of the formula $(Cl_3SiCH_2)_2$, mixed with 10 ml. (20 mg. of platinum) of a solution which has been manufactured by dissolving 1 g. of chloroplatinic acid in 200 ml. of cyclohexanone, heating at 100° C. for one hour and drying the solution thus obtained by means of anhydrous sodium sulphate. Before passing the reactants, the contents of the reaction tower are flushed with dry nitrogen and warmed by jacket heating operated at 140° C. and regulated by a thermostat. As a result of this heating and of the heat of reaction, the contents of the tower are kept at 137° C. to 141° C. The pressure at the upper end in the interior of the reaction tower is set to 0.2 atmosphere gauge. A vessel of 2 l. capacity and spherical shape is located at the upper end of the tower. From the bottom quarter of this so-called "defoaming globe," liquid material which passes into this globe from the reaction tower is returned through a pipeline into the reaction tower at the lower end, just above the perforated plate. The amount of disilylethane which exceeds the originally employed amount of disilylethane, namely 41.7 to 83.5 ml./hour, is withdrawn through a branch of this pipeline, 20 cm. below where it leaves the globe. 5 cm. below the above-mentioned branch, 4.37 ml./hour of the catalyst solution described above are introduced into the pipeline by means of a metering device. Above the defoaming globe there is a dephlegmator from which disilylethane which has been carried away runs back into the defoaming globe. The gaseous of vaporous material which issues from the dephlegmator at a temperature of 58° C. to 60° C. is withdrawn through a condenser operated at —20° C. 1.46 to 1.54 l./hour of condensate are thereby obtained. According to analysis by gas chromatography, this condensate contains 93 to 97 percent by weight of vinyltrichlorosilane, 1 to 4 percent by weight of trichlorosilane and 1 to 3 percent by weight of 1,2-bis-trichlorosilylethane.

EXAMPLE 5

The procedure described in Example 4 is carried out in the apparatus described in Example 4, with the modification that, instead of the mixture of the reactants described there, 1.67 l./hour of methyldichlorosilane and 2.2 mols of acetylene per mol of silane are employed and, instead of bis-trichlorosilylethane, bis-methyldichlorosilylethane is employed. The contents of the reaction tower are kept at 141° C. to 142° C. by the heat of the reaction and the jacket heating which is operated at 140° C. and regulated by a thermostat. The gaseous or vaporous material issuing from the dephlegmator is at a temperature of 59° C. to 62° C. 1.87 to 1.92 l./hour of condensate are obtained from the condenser operated at —20° C. According to analysis by gas chromatography, this condensate contains 92 to 96 percent by weight of methylvinylidichlorosilane, 0.5 percent by weight of substance with a boiling point below that of methylvinyldichlorosilane and of unknown composition, and 3 to 7 percent by weight of bis-methyldichlorosilylethane. The amount of disilylethane withdrawn from the pipeline issuing from the defoaaming globe is 83.5 to 104 ml./hour.

EXAMPLE 6

The procedure described in Example 4 is carried out in the apparatus described in Example 4, with the modifications that, instead of the mixture of the reactants de- described there, 2 l./hour of 83 percent strength by weight of dimethylchlorosilane and 1.8 mols of acetylene per mol of silane are employed, instead of bis-trichlorosilyl- ethane, bis-dimethylchlorosilylethane is employed and, in- stead of 4.37 ml./hour, 31.2 ml./hour of the catalyst solu- tion described in Example 4 is employed and also that the thermostat of the jacket heating is set to 151° C. to 152° C. As a result of this heating and of the heat of re- action the contents of the reaction tower are kept at 147° C. to 149° C. The gaseous or vaporous material issuing from the dephlegmator is at a temperature of 63° C. to 65° C. 2.08 l./hour of 74 percent strength by weight di- methylvinylchlorosilane are obtained from the condenser operated at −20°. The amount of disilylethane with- drawn from the pipeline issuing from the defoaming globe is 125 to 240 ml./hour.

What we claim is:

1. A process for the manufacture of alkenyl silanes which comprises adding a hydrocarbon of the general formula RC≡CH in which R is selected from the group consisting of hydrogen, halogen, monovalent hydrocarbon radicals and halogenated monovalent hydrocarbon radi- cals to a silane having 1 or 2 Si-bonded hydrogen atoms and the remaining valencies of the silicon atom are satis- fied by groups selected from the class consisting of halo- gen, inert monovalent hydrocarbon radicals and inert hal- ogenated monovalent hydrocarbon radicals in the presence of an addition catalyst stable under the reaction conditions and a disilylethane in which the unsatisfied valencies of the silicon atoms of the disilylethane are satisfied by groups selected from the class consisting of hydrogen, halogen, inert monovalent hydrocarbon radicals and inert haloge- nated monovalent hydrocarbon radicals as essentially the sole liquid diluent at a temperature of from 120° C. to 220° C. and at a pressure of form 0.1 to 5 atmospheres gauge, and thereafter continuously removing the resulting alkenyl silane as a gas at the rate at which it is formed.

2. The process of claim 1, wherein the hydrocarbon is acetylene.

3. The process of claim 1, wherein the hydrocarbon is selected from the group consisting of acetylene, 1-pentine, 1-hexine, 1-heptine, vinyl acetylene and phenyl acetylene.

4. The process of claim 1, wherein a mixture of two or more different hydrocarbons are used.

5. The process of claim 1 wherein the hydrocarbon is in anhydrous form.

6. The process of claim 1, wherein the silane has the general formula $$R'_xSiH_yX_{4-x-y}$$

wherein R' is selected from the group consisting of a monovalent hydrocarbon radical and a halogenated mono- valent hydrocarbon radical which is free of aliphatic un- saturation, X is a halogen atom, $x$ is 0, 1, 2 or 3, $y$ is 1 or 2 and the sum of $x+y$ is 1, 2, 3 or 4.

7. The process of claim 6, wherein each hydrocarbon radical R' is a methyl radical.

8. The process of claim 6, wherein each halogen atom is a chlorine atom.

9. The process of claim 6, wherein the sum of $x+y$ is not more than 3.

10. The process of claim 6, wherein the silane is se- lected from the group consisting of methyldichlorosilane, dimethylchlorosilane and trichlorosilane.

11. The process of claim 1, wherein a mixture of dif- ferent silanes is used.

12. The process of claim 1 wherein more than 1 gram mol of the hydrocarbon is used per gram atom of silicon bonded hydrogen.

13. The process of claim 1 wherein the addition cata- lyst is selected from the group consisting of a platinum compound, palladium, a rhodium compound and a co- balt carbonyl.

14. The process of claim 13, wherein the catalyst is a platinum compound.

15. The process of claim 14, wherein the catalyst is a reaction product of chloroplatinic acid with a ketone.

16. The process of claim 15, wherein the catalyst is a reaction product of chloroplatinic acid with cyclohexa- none.

17. The process of claim 1, wherein additional catalyst is introduced into the reaction vessel during the reaction.

18. The process of claim 1, wherein the hydrocarbon is acetylene and the disilylethane is the disilylethane which is produced as a by-product in the particular process that is being carried out.

19. The process of claim 1, wherein the reaction is car- ried out at a temperature of 130° C. to 160° C.

20. The process of claim 1, wherein the process is car- ried out at a pressure of from 0.1 to 0.5 atmosphere gauge.

References Cited

UNITED STATES PATENTS

| | | | |
|---|---|---|---|
| 2,823,218 | 2/1958 | Speir et al. | 260—448.2 E |
| 3,404,169 | 10/1968 | Gaignon et al. | 260—448.2 E |
| 2,721,873 | 10/1955 | MacKenzie et al. | 260—448.2 E |
| 2,970,150 | 1/1961 | Bailey | 260—448.2 EX |
| 3,271,362 | 9/1966 | Chalk et al. | 260—448.2 EX |

DANIEL E. WYMAN, Primary Examiner

P. F. SHAVER, Assistant Examiner

U.S. Cl. X.R.

260—448.8 R